United States Patent
Toyamasaki

(10) Patent No.: US 10,757,278 B2
(45) Date of Patent: Aug. 25, 2020

(54) IMAGE FORMING APPARATUS THAT EXECUTES FIRST JOB AND SECOND JOB IN PARALLEL

(71) Applicant: KYOCERA Document Solutions Inc., Osaka (JP)

(72) Inventor: Kenta Toyamasaki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/528,028

(22) Filed: Jul. 31, 2019

(65) Prior Publication Data

US 2020/0045189 A1 Feb. 6, 2020

(30) Foreign Application Priority Data

Aug. 2, 2018 (JP) .................. 2018-145979

(51) Int. Cl.
*G06F 3/12* (2006.01)
*H04N 1/00* (2006.01)
*G06F 3/041* (2006.01)

(52) U.S. Cl.
CPC ....... *H04N 1/00411* (2013.01); *G06F 3/0412* (2013.01); *G06F 3/0416* (2013.01); *H04N 1/00798* (2013.01)

(58) Field of Classification Search
None
See application file for complete search history.

(56) References Cited

U.S. PATENT DOCUMENTS

| 10,459,558 | B2* | 10/2019 | Horiike | G06F 3/0412 |
| 2015/0146255 | A1* | 5/2015 | Shintani | H04N 1/0092 358/1.15 |
| 2016/0080592 | A1* | 3/2016 | Oshima | H04N 1/00244 358/1.15 |
| 2019/0132460 | A1* | 5/2019 | Sawano | H04N 1/00517 |

FOREIGN PATENT DOCUMENTS

JP 08223382 A * 8/1996
JP H08-223382 A 8/1996

* cited by examiner

*Primary Examiner* — Henok Shiferaw
(74) *Attorney, Agent, or Firm* — Stedebaker & Brackett PC

(57) ABSTRACT

An image forming apparatus includes a touch display and a controller. The touch display receives a request for executing a first job. The touch display displays a first setting screen for setting a first condition related to the first job. The controller executes the first job and a second job different from the first job in parallel. The first setting screen includes a start button. When the start button is touched, the touch display displays a second setting screen. The second setting screen includes a first job setting area and a second job setting area. In the first job setting area, a setting icon corresponding to the first condition set in the first setting screen is displayed. When the setting icon is copied to the second job setting area, the controller causes the first condition to be reflected in a second condition related to the second job.

8 Claims, 12 Drawing Sheets

IMAGE FORMING APPARATUS THAT EXECUTES FIRST JOB AND SECOND JOB IN PARALLEL

INCORPORATION BY REFERENCE

The present application claims priority under 35 U.S.C. § 119 to Japanese Patent Application No. 2018-145979, filed on Aug. 2, 2018. The contents of this application are incorporated herein by reference in their entirety.

BACKGROUND

The present disclosure relates to an image forming apparatus.

Various electronic devices executing a plurality of jobs in parallel have been disclosed. For example, some image processing apparatuses execute a plurality of jobs in parallel. More specifically, such an image processing apparatus includes a job execution resource, job execution control means, and instruction operation means. The job execution resource includes an image reading device and the like. The job execution control means controls, as a job, an operation of the job execution resource. The instruction operation means functions as instruction inputting means and display means. The instruction operation means includes a menu switching key. The display means includes a displaying device that displays a display screen. The display screen displays information on a job in process. The information on a job in process corresponds to, for example, contents of setting of the job in process. When the menu switching key is operated, the display screen for the job in process is switched to a display screen for another job.

SUMMARY

An image forming apparatus according to the present disclosure includes a touch display and a controller. The touch display receives a request for executing a first job. The touch display displays a first setting screen for setting a first condition related to the first job. The controller controls an operation of the touch display. The controller executes the first job and a second job different from the first job in parallel. The first setting screen includes a start button. When the start button is touched, the touch display displays a second setting screen. The second setting screen includes a first job setting area corresponding to the first job, and a second job setting area corresponding to the second job. In the first job setting area, a setting icon corresponding to the first condition set in the first setting screen is displayed. The second job setting area is an area where the setting icon can be copied. When the setting icon is copied to the second job setting area, the controller causes the first condition to be reflected in a second condition related to the second job.

DETAILED DESCRIPTION

Figure 1:
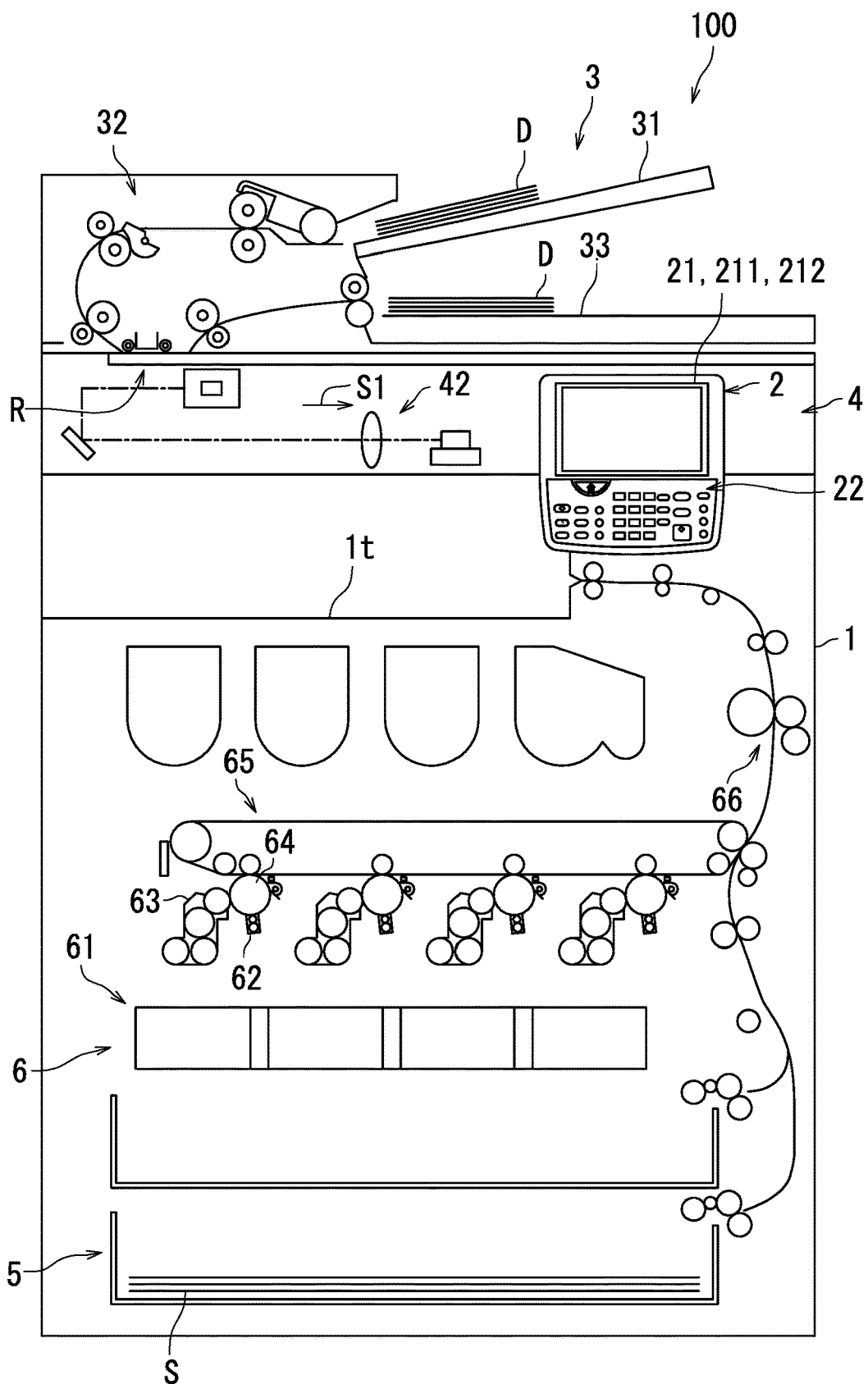
FIG. 1 is a diagram illustrating a structure of an image forming apparatus according to an embodiment of the present disclosure.

An embodiment of an image forming apparatus according to the present disclosure will now be described with reference to the accompanying drawings. It is noted that the same reference signs are used in the drawings to refer to the same or corresponding elements to avoid redundant description.

First, referring to FIG. 1, the structure of an image forming apparatus 100 according to the embodiment of the present disclosure will be described. FIG. 1 is a diagram illustrating the structure of the image forming apparatus 100 of the present embodiment. In the present embodiment, the image forming apparatus 100 is a multifunction peripheral. The image forming apparatus 100 has a multi-task function. The multi-task function means a function to execute a main job and a parallel job in parallel. It is noted that the parallel job is a job that is different from the main job, and can be executed by the image forming apparatus 100 in parallel to the main job. The main job is an example of a first job, and the parallel job is an example of a second job.

As illustrated in FIG. 1, the image forming apparatus 100 includes a housing 1, an operating section 2, an original document conveyance device 3, an original document reading device 4, a paper feed section 5, a printing section 6, and an exit tray 1*t*.

The operating section 2 receives an instruction from a user to the image forming apparatus 100. When an instruction from a user is received, the operating section 2 outputs a signal corresponding to the instruction from the user. In the present embodiment, the operating section 2 receives a job execution request from a user. In the present embodiment, the job includes a "copy job", a "transmission job", and a "facsimile transmission job".

The operating section 2 includes a touch display 21 and a plurality of hard keys 22. The touch display 21 includes a display 211 and a touch sensor 212.

The display 211 displays various screens including a home screen. The home screen includes a plurality of job selecting buttons. A user selects a job required for execution by touching a job selecting button corresponding to the job required for execution. In the following description, a job selected through the home screen is referred to as the "main job". The display 211 is, for example, a liquid crystal display or an organic electro luminescence (EL) display.

The touch sensor 212 detects a touch by a detection target. The touch sensor 212 outputs a detection signal corresponding to a position where the touch by the detection target is detected. In the following description, the position where the touch by the detection target is detected is referred to as a "touch position". The detection target is, for example, a finger of a user. The touch sensor 212 is, for example, a resistive film type touch sensor or a capacitance type touch sensor.

The plural hard keys 22 include, for example, a start key and a cancel key.

The original document conveyance device 3 conveys an original document D. The original document conveyance device 3 includes an original document load tray 31, an original document conveying section 32, and an original document exit tray 33. The original document conveying section 32 conveys original documents D loaded on the original document load tray 31 one by one to the original document exit tray 33 through a reading position R. The reading position R corresponds to a position where the original document reading device 4 can read the image of the original document D.

The original document reading device 4 reads the image of the original document D, and outputs data corresponding to the image of the original document D. The original document reading device 4 includes a contact glass 41 and a reading mechanism 42. The reading mechanism 42 reads the image of the original document D loaded on the contact glass 41, and outputs the data corresponding to the image of the original document D. Alternatively, the reading mechanism 42 reads the image of the original document D passing through the reading position R, and outputs the data corresponding to the image of the original document D. The reading mechanism 42 includes a light source, a carriage, an optical system, and a charge-coupled device (CCD) image sensor. The original document reading device 4 is, for example, a scanner.

The paper feed section 5 holds a plurality of sheets S, and feeds the plurality of sheets S held therein one by one. Each sheet S fed from the paper feed section 5 is conveyed to the printing section 6. The sheet S is, for example, paper.

The printing section 6 performs printing on the sheet S conveyed from the paper feed section 5. Specifically, the printing section 6 forms an image on the sheet S. In the present embodiment, the printing section 6 includes an exposing device 61, a charging device 62, a developing device 63, a photosensitive drum 64, a transfer device 65, and a fixing device 66, and forms an image by an electrophotographic method. The exposing device 61 forms, based on image data, an electrostatic latent image on the photosensitive drum 64. The charging device 62 uniformly charges the photosensitive drum 64 to prescribed potential. The developing device 63 supplies a toner to the photosensitive drum 64 to develop the electrostatic latent image formed on the photosensitive drum 64. The transfer device 65 transfers the thus obtained toner image onto the sheet S. The fixing device 66 fixes the thus transferred toner image on the sheet S. The sheet S having the image thus formed thereon is discharged to the exit tray 1t. The exit tray 1t is provided outside the housing 1.

Figure 2:
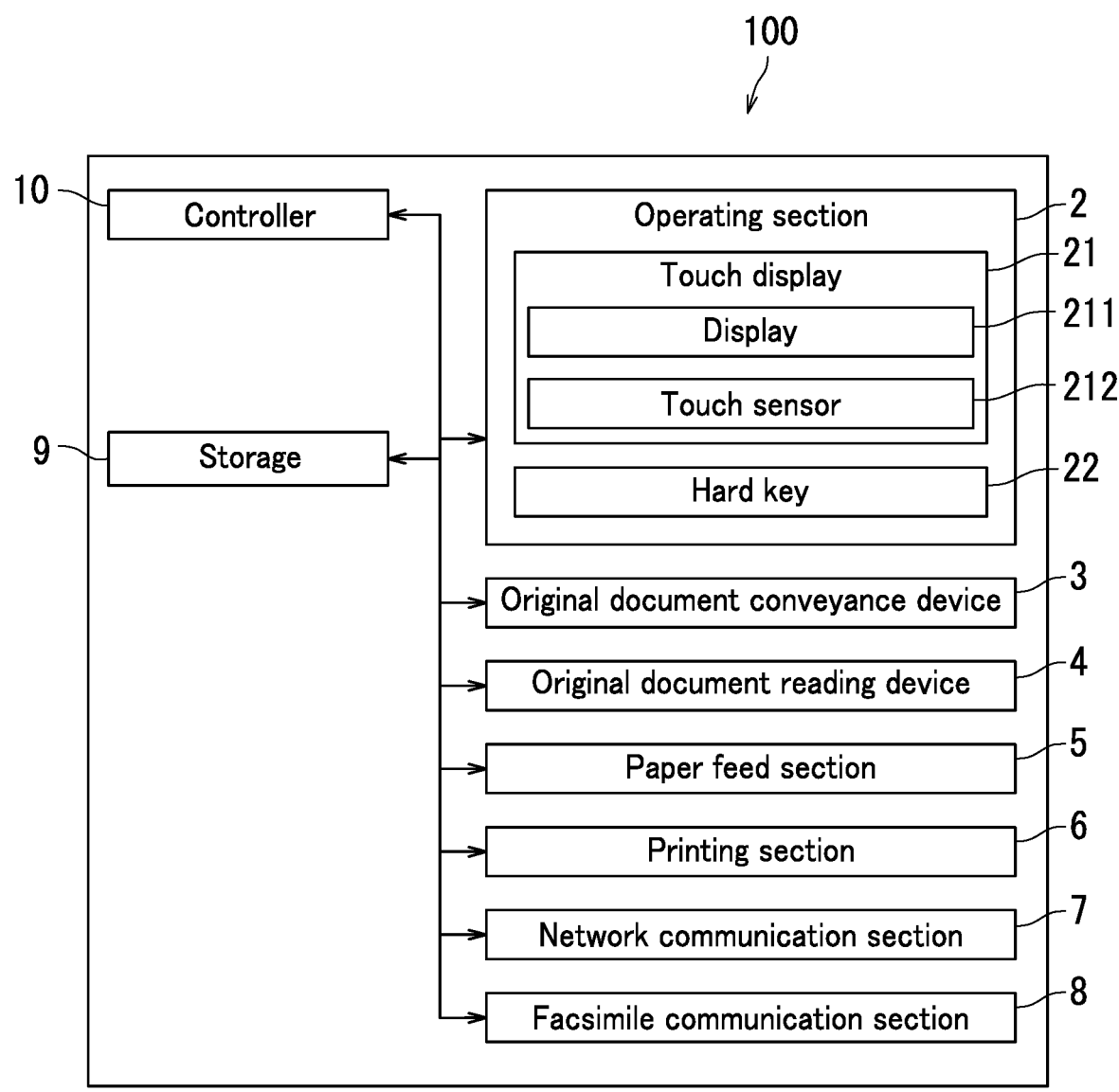
FIG. 2 is a block diagram illustrating the structure of the image forming apparatus of the embodiment of the present disclosure.

Subsequently, referring to FIGS. 1 and 2, the structure of the image forming apparatus 100 according to the embodiment of the present disclosure will be further described. FIG. 2 is a block diagram illustrating the structure of the image forming apparatus 100 of the present embodiment.

As illustrated in FIG. 2, the image forming apparatus 100 further includes a network communication section 7, a facsimile communication section 8, storage 9, and a controller 10.

The network communication section 7 performs data communication with an external apparatus equipped with a communication device employing the same communication system. In the present embodiment, the network communication section 7 is a local area network (LAN) adaptor. The network communication section 7 is connected to the external apparatus through a network such as the Internet. The external apparatus is, for example, a personal computer.

The facsimile communication section 8 performs data communication with an external facsimile apparatus through a public telephone network. The facsimile communication section 8 includes, for example, a network control unit (NCU), a modem, and an encoding/decoding section.

The storage 9 stores various data. The storage 9 includes a storage device and semiconductor memory. The storage device includes, for example, a hard disk drive (HDD) and/or a solid state drive (SSD). The semiconductor memory includes, for example, random access memory (RAM) or read only memory (ROM).

The controller 10 includes a processor such as a central processing unit (CPU). Besides, the controller 10 includes an integrated circuit for image forming processing. The integrated circuit for image forming processing includes, for example, an application specific integrated circuit (ASIC). The controller 10 controls operations of the respective sections of the image forming apparatus 100 by executing a control program stored in the storage 9.

When a user selects a main job through the home screen, the controller 10 causes the touch display 21 to display a first setting screen corresponding to the main job. The first setting screen is a setting screen for setting a condition related to the main job. In the following description, the condition related to the main job is referred to as the "first condition". The first condition includes, for example, a condition related to a resolution value. The first setting screen corresponds to the type of each main job.

For example, when a user selects the transmission job through the home screen, the controller 10 causes the touch display 21 to display the first setting screen corresponding to the transmission job. The transmission job is a job of transmitting, by e-mail to a specified destination, image data having been converted to have a specified resolution value.

Figure 3:
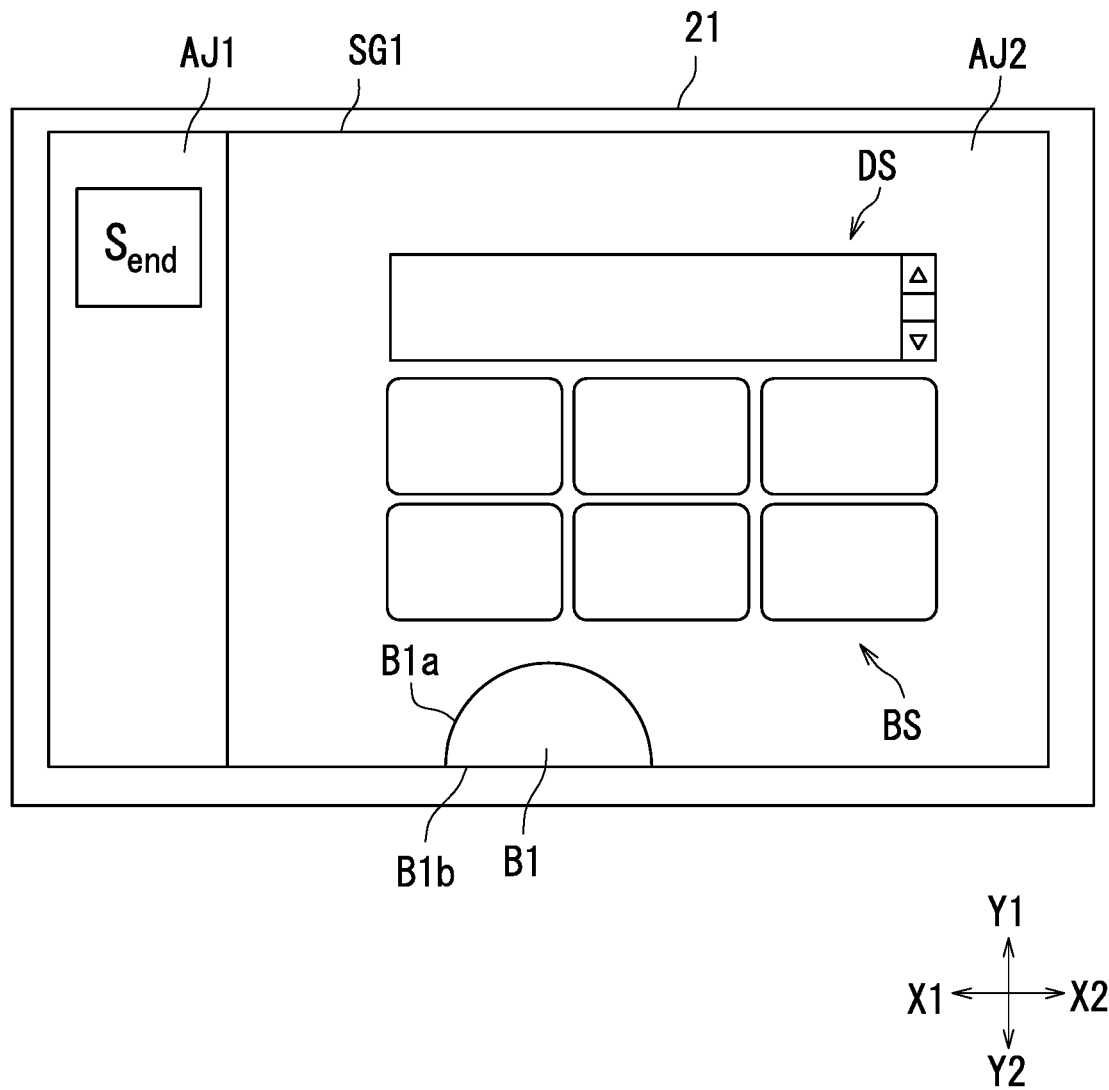
FIG. 3 is a diagram illustrating an example of a first setting screen of the embodiment of the present disclosure.

Subsequently, referring to FIGS. 1 to 3, the first setting screen SG1 of the present embodiment will be described. FIG. 3 is a diagram illustrating an example of the first setting screen SG1 of the present embodiment. The following description will be given on the assumption that the lengthwise direction of the touch display 21 corresponds to an X-axis direction, with one side along the X-axis direction referred to as the "X1" side and the other side referred to as the "X2" side. Besides, it is assumed that the direction perpendicular to the X-axis direction corresponds to a Y-axis direction, with one side along the Y-axis direction referred to as the "Y1" side and the other side referred to as the "Y2" side.

As illustrated in FIG. 3, the first setting screen SG1 is in a substantially rectangular shape. The first setting screen SG1 includes a job menu display area AJ1 and a job condition setting area AJ2. The job menu display area AJ1 and the job condition setting area AJ2 are adjacent to each other in the X-axis direction.

The job menu display area AJ1 indicates the type of the main job. In other words, the job menu display area AJ1 displays the type of the main job to be set for the condition in the first setting screen SG1. In a case exemplified in FIG. 3, the job menu display area AJ1 indicates that the type of the main job is the "transmission job (Send)".

The job condition setting area AJ2 includes a display section DS and a setting section BS. The display section DS displays contents set as the condition of the main job. The display section DS displays, for example, a destination set as the condition of the main job.

The setting section BS is operated by a user to set the condition of the main job. In the present embodiment, a user operates the setting section BS to set the condition of the main job.

The setting section BS includes, for example, a plurality of buttons for setting the condition of the main job. The buttons for setting the condition of the main job include buttons for setting, for example, "aggregation execution" and "resolution value". For example, when "aggregation execution" is set as the condition, the job is executed so that a plurality of original documents D can be aggregated in one sheet S. Besides, for example, when an arbitrary value is set as the "resolution value", the job is executed based on image data having the set resolution value.

When the condition of the main job is set, the controller 10 causes the storage 9 to store data corresponding to the condition of the main job. In the following description, the condition of the main job is referred to as the "first condition" and the data corresponding to the first condition is referred to as the "first condition data". The first condition data is stored in association with job identification data. The job identification data is data for identifying the job. The job identification data includes data corresponding to the type of the job. In the present embodiment, the first condition data and the job identification data are stored in the storage 9 until the main job is executed.

Besides, the first setting screen SG1 includes a start button B1. The start button B1 is in a semi-circular shape. Specifically, the start button B1 includes an arc section B1a and a diameter section B1b.

In the case exemplified in FIG. 3, the start button B1 is displayed in the job condition setting area AJ2. Specifically, the start button B1 is displayed in an end portion on the Y2 side in the job condition setting area AJ2 of the first setting screen SG1. More specifically, the start button B1 is displayed to have the diameter section B1b substantially according with an end side on the Y2 side of the first setting screen SG1.

Figure 4:
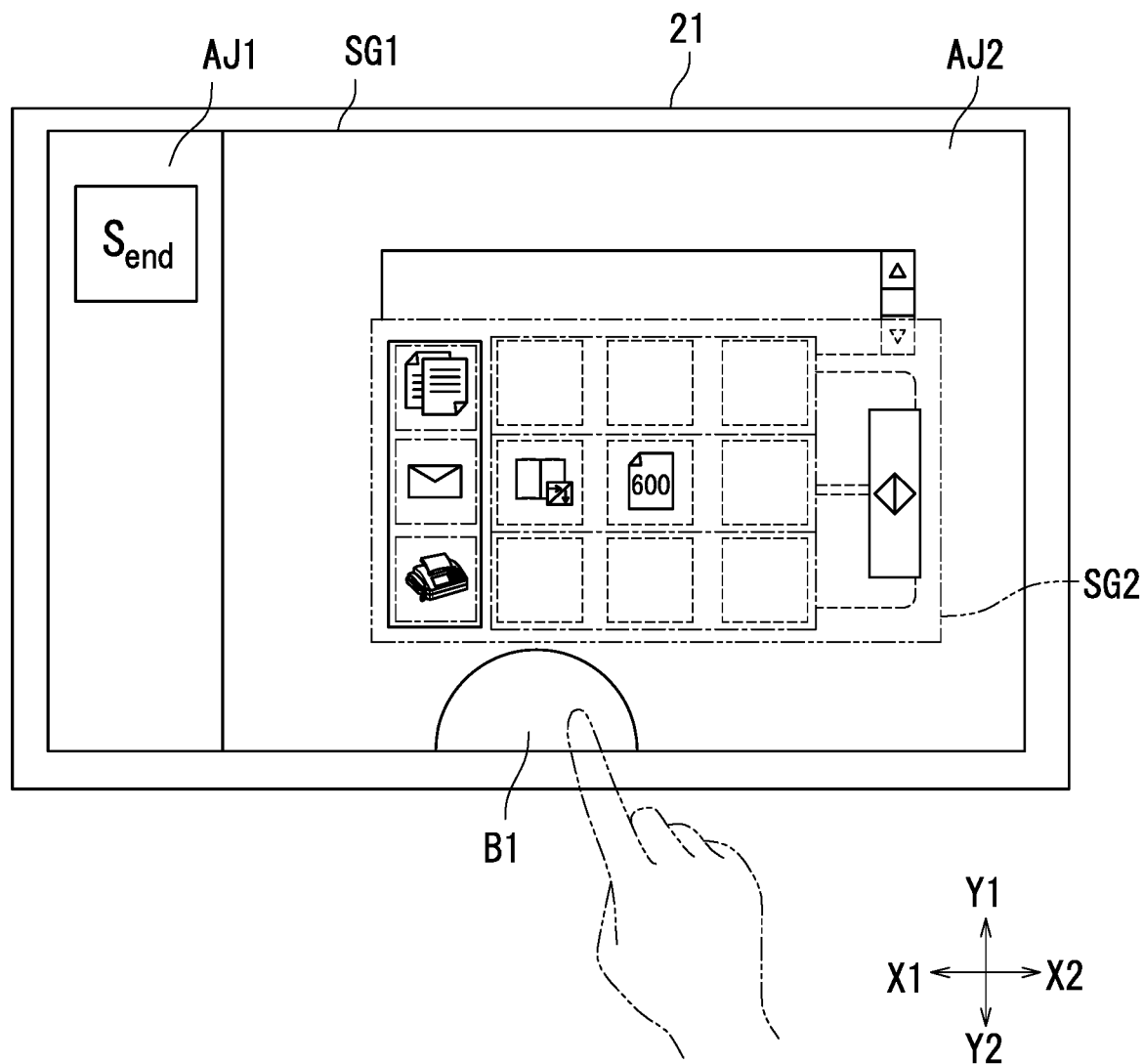
FIG. 4 is a diagram illustrating the first setting screen and a second setting screen of the embodiment of the present disclosure.

Subsequently, referring to FIGS. 1 to 4, a second setting screen SG2 according to the present embodiment will be described. FIG. 4 is a diagram illustrating the first setting screen SG1 and the second setting screen SG2 of the present embodiment. When a user touches the start button B1, the second setting screen SG2 is displayed on the touch display 21.

When a user touches the start button B1, the controller 10 causes the touch display 21 to display the second setting screen SG2 in a layer above the first setting screen SG1 as illustrated in FIG. 4. Specifically, the controller 10 determines, based on the detection signal transmitted from the touch display 21, whether or not a user is touching the start button B1. When it is determined that the user is touching the start button B1, the controller 10 causes the touch display 21 to display the second setting screen SG2. In other words, the controller 10 causes the touch display 21 to display the second setting screen SG2 while the user is continuously touching the start button B1.

On the other hand, when it is determined that the user is not touching the start button B1, the controller 10 does not cause the touch display 21 to display the second setting screen SG2. In other words, when the user releases the touch on the start button B1, the controller 10 causes the touch display 21 to complete displaying the second setting screen SG2.

Besides, the second setting screen SG2 has partial transparency. Accordingly, even when the touch display 21 is displaying the second setting screen SG2, a user can visually recognize a part of the first setting screen SG1 through the second setting screen SG2.

Besides, while the second setting screen SG2 is being displayed, the touch display 21 does not receive an operation on the first setting screen SG1 excluding the operation on the start button B1. Specifically, while the second setting screen SG2 is being displayed, the touch display 21 receives only the operation on the start button B1 and an operation on the second setting screen SG2.

Figure 5:
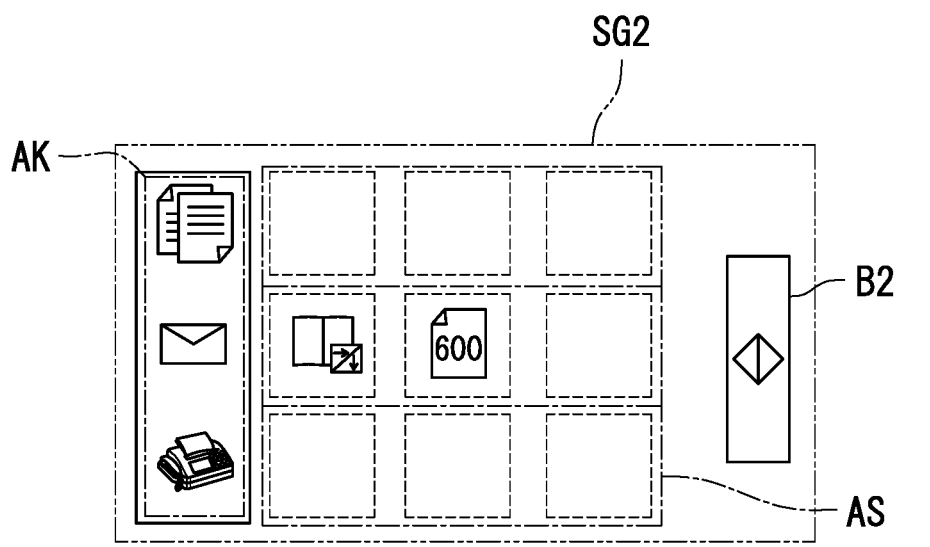
FIG. 5 is a diagram illustrating a structure of the second setting screen of the embodiment of the present disclosure.

Subsequently, referring to FIGS. 5 to 7, the structure of the second setting screen SG2 of the present embodiment will be described. FIG. 5 is a diagram illustrating the structure of the second setting screen SG2 of the present embodiment.

As illustrated in FIG. 5, the second setting screen SG2 includes a job type area AK, a job setting area AS, and a job execution button B2.

The job execution button B2 is a button for instructing execution of a job. When a user touches the job execution button B2, the controller 10 executes a job. In the present embodiment, when a user touches the job execution button B2, the controller 10 executes the main job and the parallel job.

Next, referring to FIG. 6, the job type area AK of the present embodiment will be described. FIG. 6 is a diagram illustrating the job type area AK of the present embodiment and a surrounding portion thereof.

Figure 6:
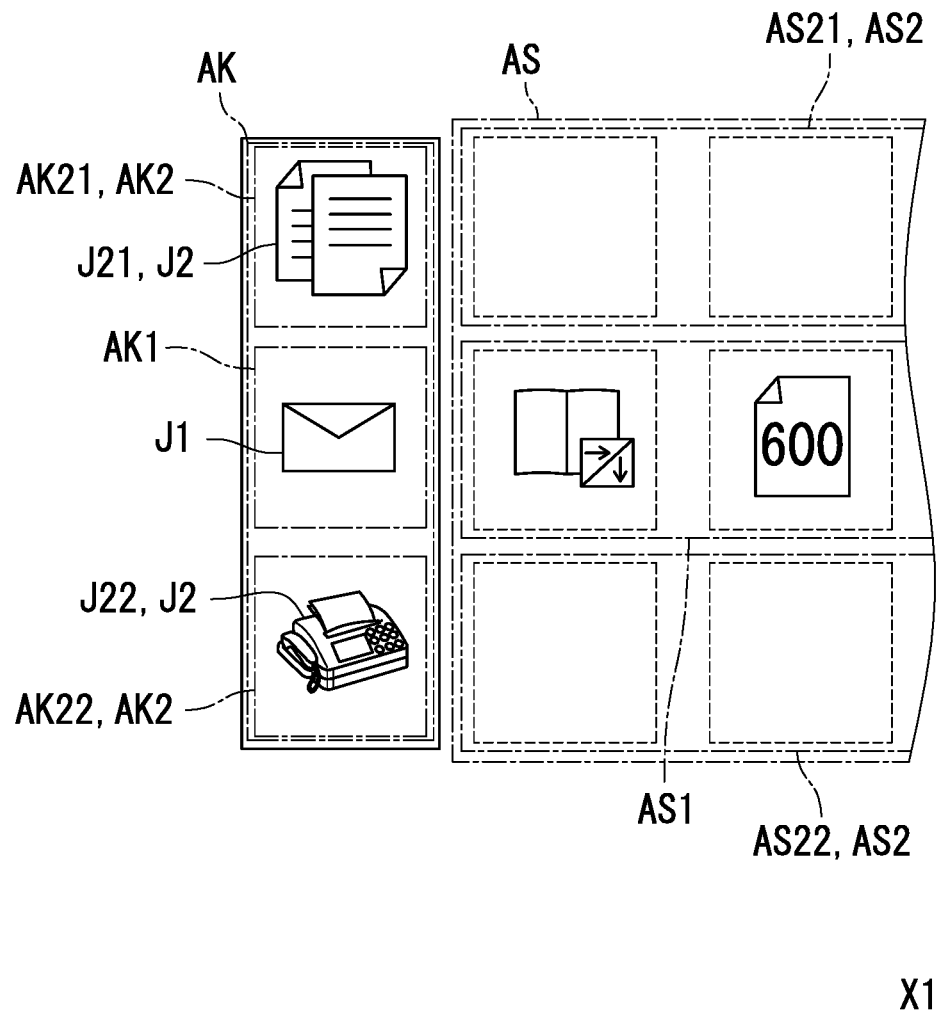
FIG. 6 is a diagram illustrating a job type area and a surrounding portion thereof of the embodiment of the present disclosure.

As illustrated in FIG. 6, the job type area AK includes a main job type area AK1 and two parallel job type areas AK2. The two parallel job type areas AK2 are opposite to each other in the Y-axis direction across the main job type area AK1. In the following description, one disposed on the Y1 side of the two parallel job type areas AK2 may be referred to as the "first parallel job type area AK21". Besides, the other disposed on the Y2 side of the two parallel job type areas AK2 may be referred to as the "second parallel job type area AK22".

In the main job type area AK1, a main job icon J1 is displayed. The main job icon J1 indicates the type of the main job. In the present embodiment, in the main job type area AK1, an icon indicating the type of the job corresponding to the first setting screen SG1 described with reference to FIG. 3 is displayed. In a case exemplified in FIG. 6, the main job icon J1 indicates the "transmission job".

The two parallel job type areas AK2 respectively indicate different types of the parallel job. In the present embodiment, in the two parallel job type areas AK2, different parallel job icons J2 are respectively displayed. The plural parallel job icons J2 respectively indicate the different types of the parallel job.

In the first parallel job type area AK21, a first parallel job icon J21 is displayed. In the second parallel job type area AK22, a second parallel job icon J22 is displayed. In the case exemplified in FIG. 6, the first parallel job icon J21 indicates the "copy job", and the second parallel job icon J22 indicates the "facsimile transmission job".

The job setting area AS is adjacent to the job type area AK along the X-axis direction. The job setting area AS includes a main job setting area AS1, and two parallel job setting areas AS2. The main job setting area AS1 is an example of a first job setting area, and the parallel job setting area AS2 is an example of a second job setting area.

The two parallel job setting areas AS2 are opposite to each other in the Y-axis direction across the main job setting area AS1. In the following description, one disposed on the Y1 side of the two parallel job setting areas AS2 may be referred to as the "first parallel job setting area AS21". Besides, the other disposed on the Y2 side of the two parallel job setting areas AS2 may be referred to as the "second parallel job setting area AS22".

The main job setting area AS1 corresponds to the main job type area AK1. The main job setting area AS1 is an area for indicating a condition, in the first condition set in the first setting screen SG1 described with reference to FIG. 3, that can be reflected in a parallel job.

The first parallel job setting area AS21 corresponds to the first parallel job type area AK21. The first parallel job setting area AS21 is an area for setting a condition of the parallel job corresponding to the first parallel job type area AK21.

The second parallel job setting area AS22 corresponds to the second parallel job type area AK22. The second parallel job setting area AS22 is an area for setting a condition of the parallel job corresponding to the second parallel job type area AK22. In the following description, the condition of the parallel job is referred to as the "second condition".

Subsequently, referring to FIG. 7, the job setting area AS of the present embodiment will be further described. FIG. 7 is a diagram illustrating the job setting area AS of the present embodiment and a surrounding portion thereof.

The main job setting area AS1 includes three main areas. The three main areas are disposed along the X-axis direction. In the following description, the three main areas may be referred to as the "first main area AS1*a*", the "second main area AS1*b*", and the "third main area AS1*c*" disposed in the stated order from the X1 side toward the X2 side.

A setting icon T1 is displayed at least one of the first main area AS1*a* to the third main area AS1*c*. The setting icon T1 indicates a condition, in the first condition set in the first setting screen SG1 described with reference to FIG. 3, that can be reflected in a parallel job.

Figure 7:
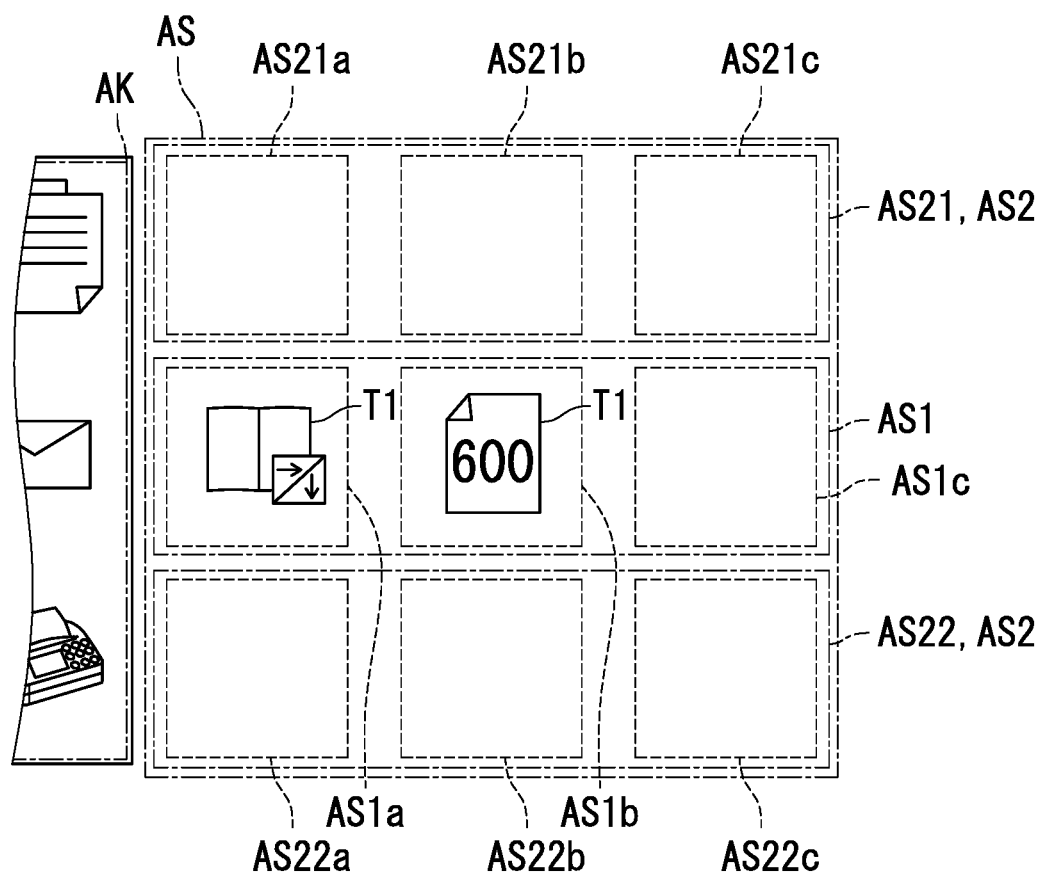
FIG. 7 is a diagram illustrating a job setting area and a surrounding portion thereof of the embodiment of the present disclosure.

In a case exemplified in FIG. 7, an "aggregation icon" corresponding to aggregation execution is displayed in the first main area AS1*a*. Besides, a "resolution icon" indicating that the resolution is set to a set value is displayed in the second main area AS1*b*.

The first parallel job setting area AS21 and the second parallel job setting area AS22 are areas where the setting icon T1 can be copied from the main job setting area AS1.

In the present embodiment, the first parallel job setting area AS21 includes three parallel areas. The three parallel areas are disposed along the X-axis direction. In the following description, the three main areas may be referred to as the "first parallel area AS21*a*", the "second parallel area AS21*b*", and the "third parallel area AS21*c*" disposed in the stated order from the X1 side toward the X2 side.

The second parallel job setting area AS22 includes three parallel areas. The three parallel areas are disposed along the X-axis direction. In the following description, the three parallel areas may be referred to as the "first parallel area AS22*a*", the "second parallel area AS22*b*", and the "third parallel area AS22*c*" disposed in the stated order from the X1 side toward the X2 side. Incidentally, the three parallel areas of the first parallel job setting area AS21 (namely, the first parallel area AS21*a* to the third parallel area AS21*c*) and the three parallel areas of the second parallel job setting area AS22 (namely, the first parallel area AS22*a* to the third parallel area AS22*c*) are examples of a condition area.

The first parallel area AS21*a* to the third parallel area AS21*c* of the first parallel job setting area AS21 and the first parallel area AS22*a* to the third parallel area AS22*c* of the second parallel job setting area AS22 respectively correspond to the first main area AS1*a* to the third main area AS1*c* adjacent thereto along the Y-axis direction. Specifically, the first parallel area AS21*a* and the first parallel area AS22*a* correspond to the first main area AS1*a*, the second parallel area AS21*b* and the second parallel area AS22*b* correspond to the second main area AS1*b*, and the third parallel area AS21*c* and the third parallel area AS22*c* correspond to the third main area AS1*c*.

A user can copy the setting icon T1 displayed in at least one of the three main areas to a parallel area. In the present embodiment, a user can copy the setting icon T1 from at least one main area out of the three main areas merely to the corresponding parallel area. Specifically, a user can copy the setting icon T1 displayed in the first main area AS1*a* to at least one of the first parallel area AS21*a* and the first parallel area AS22*a*. Besides, a user can copy the setting icon T1 displayed in the second main area AS1*b* to at least one of the second parallel area AS21*b* and the second parallel area AS22*b*. Furthermore, a user can copy the setting icon T1 displayed in the third main area AS1*c* to at least one of the third parallel area AS21*c* and the third parallel area AS22*c*. In other words, in the case exemplified in FIG. 7, a user can copy the setting icon T1 from each main area merely to an area adjacent to this main area along the Y-axis direction.

Next, referring to FIGS. 8 and 9, an operation method performed by a user on the second setting screen SG2 will be described.

First, referring to FIG. 8, an operation method for reflecting the first condition to the second condition will be described. FIG. 8 is a diagram illustrating the operation method for reflecting the first condition to the second condition according to the present embodiment. In FIG. 8, it is assumed that the "aggregation execution" of the condition (first condition) of the transmission job is reflected in the condition (second condition) of the copy job. It is noted that the first setting screen SG1 visually recognized through the second setting screen SG2 is not illustrated in FIG. 8 for easy understanding.

Figure 8:
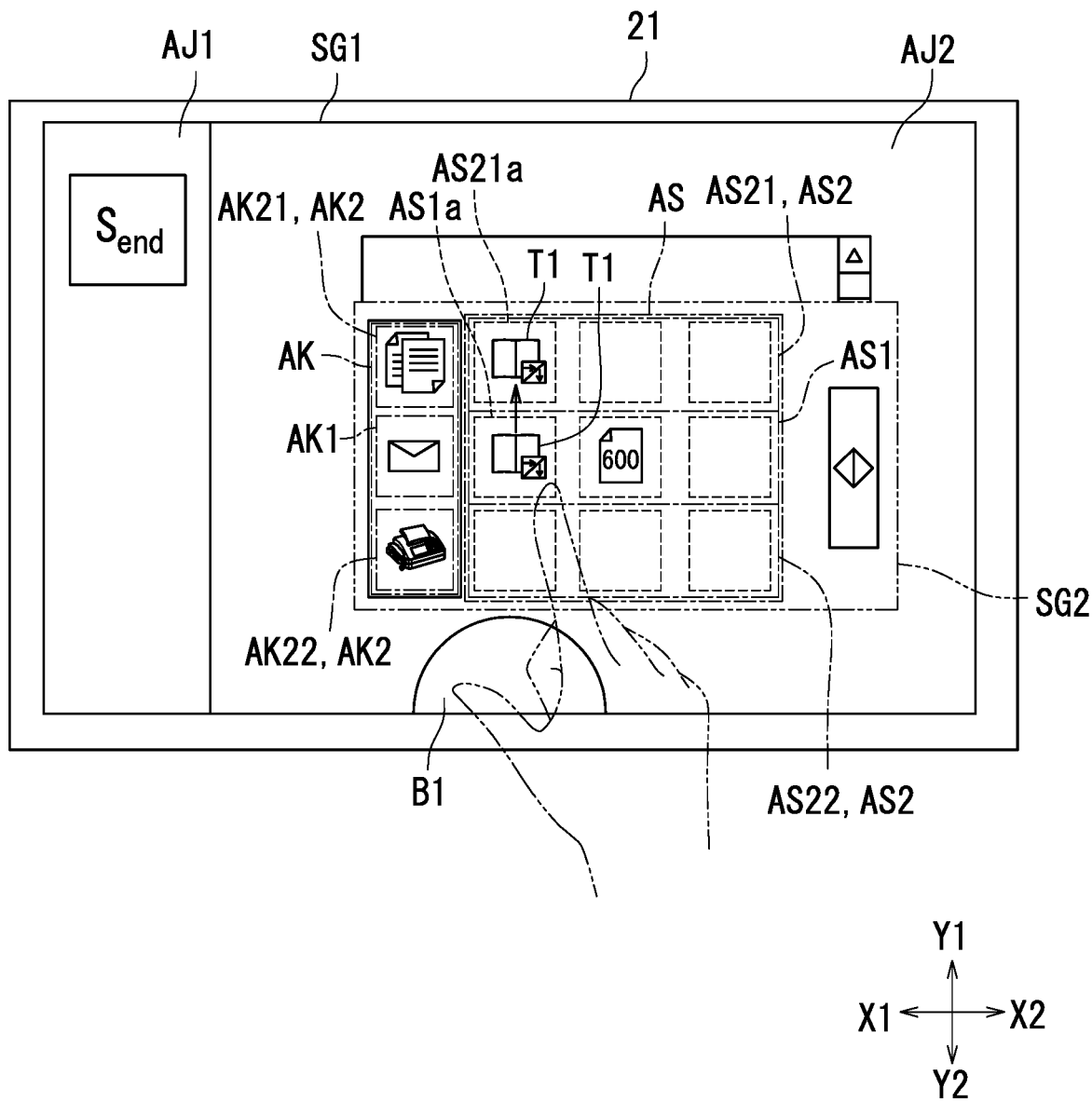
FIG. 8 is a diagram illustrating an operation method for reflecting a first condition in a second condition according to the embodiment of the present disclosure.

As illustrated in FIG. 8, while a user is touching the start button B1 with his/her one finger, he/she drags, with another finger, the setting icon T1 (aggregation icon) displayed in the first main area AS1*a* to the first parallel area AS21*a* (namely, slides the icon to the first parallel area AS21*a* with the touch kept), and thus, the setting icon T1 is copied from the first main area AS1*a* to the first parallel area AS21*a*.

When the setting icon T1 is copied from the first main area AS1*a* to the first parallel area AS21*a*, the controller 10 reflects the first condition corresponding to the setting icon T1 to the second condition.

Specifically, the controller 10 obtains coordinate data corresponding to a position where the setting icon T1 has been copied, and specifies the first parallel area AS21*a* where the setting icon T1 has been copied based on the coordinate data corresponding to the position where the setting icon T1 has been copied. It is noted that coordinate data corresponding to a position in the parallel job setting area AS2 is precedently stored in the storage 9.

When the parallel job setting area AS2 where the setting icon T1 has been copied is specified, the controller 10 obtains the type of the parallel job corresponding to the specified parallel job setting area AS2. For example, the controller 10 obtains the type of the parallel job corresponding to the parallel job setting area AS2 by specifying the parallel job type area AK2 corresponding to the parallel job setting area AS2. When the type of the parallel job is obtained, the controller 10 reflects the first condition in the condition (the second condition) of the obtained parallel job. For example, the controller 10 reflects the first condition in the second condition by storing, in the storage 9, data corresponding to the type of the parallel job in association with data corresponding to the second condition (i.e., a duplicate of the data corresponding to the first condition). In the following description, the data corresponding to the second condition is referred to as the "second condition data".

In the present embodiment, the second condition data is stored in the storage 9 until the main job is executed. In other words, the controller 10 does not delete the first condition data and the second condition data from the storage 9 until the main job is executed even when the touch on the start button B1 is released to complete displaying the second setting screen SG2. Accordingly, even when the touch on the start button B1 is released because a user moves his/her finger away from the start button B1 in error, the second condition data is inhibited from being deleted from the storage 9.

Next, referring to FIG. 9, an operation method for executing the multi-task function will be described. FIG. 9 is a diagram illustrating the operation method for executing the multi-task function according to the present embodiment. It is noted that FIG. 9 corresponds to the second setting screen SG2 of FIG. 8. In other words, FIG. 9 illustrates the second setting screen SG2 in which the setting icon T1 (aggregation icon) has been copied from the first main area AS1a to the first parallel area AS21a.

Figure 9:
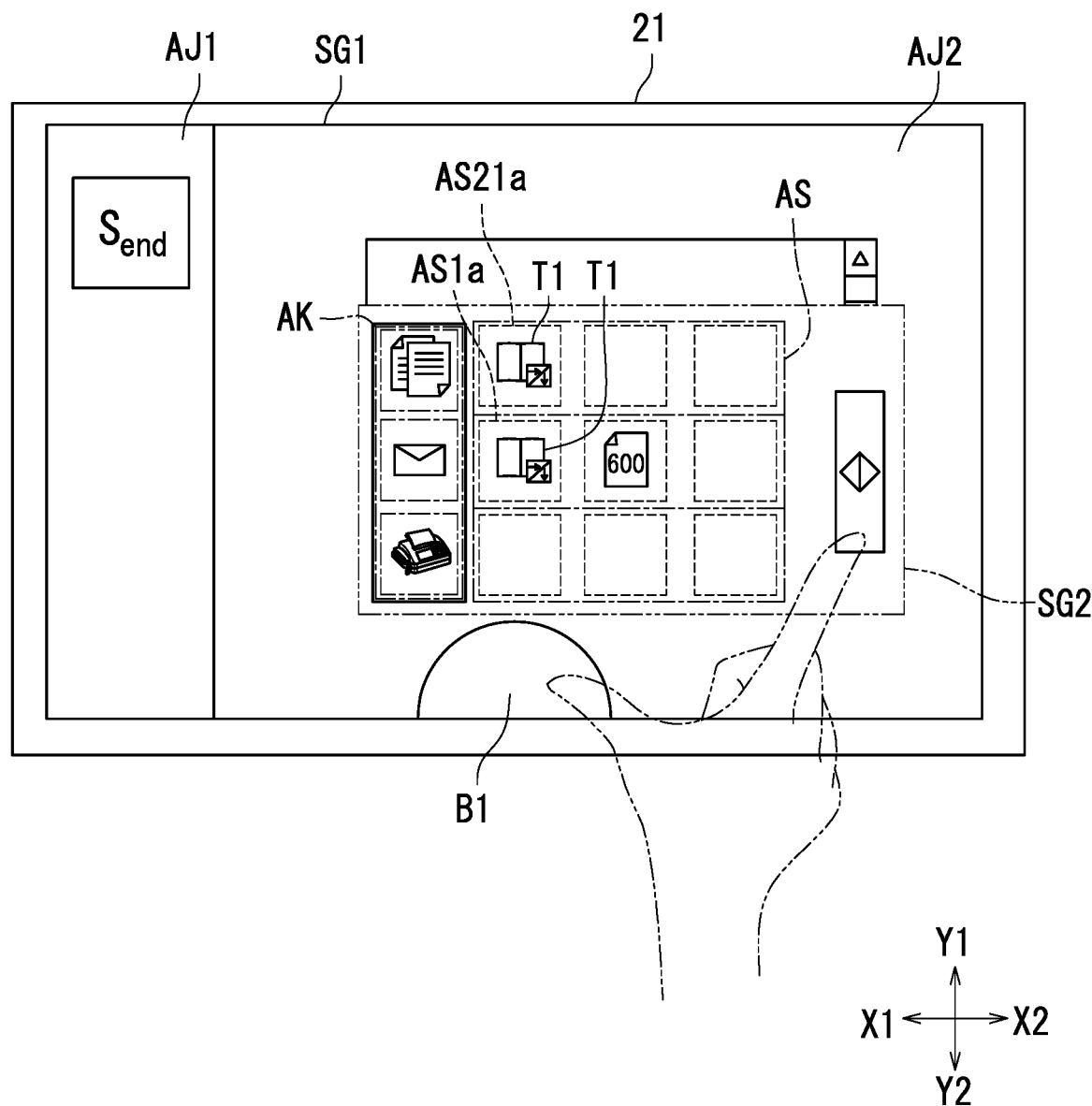
FIG. 9 is a diagram illustrating an operation method for executing a multi-task function according to the embodiment of the present disclosure.

As illustrated in FIG. 9, while a user is touching the start button B1 with his/her one finger, he/she touches the job execution button B2 with another finger, and thus, the controller 10 executes the main job and the parallel job for which the setting icon T1 has been copied. In other words, the controller 10 executes, in parallel, the main job and the parallel job with the first condition reflected in the second condition.

For example, when the main job is the transmission job and the parallel job is the copy job, the controller 10 causes the original document reading device 4 to read the image of the original document D. The controller 10 transmits data corresponding to the image of the original document D thus read by the original document reading device 4 to a specified destination through the network communication section 7 as well as causes the printing section 6 to perform print processing based on the data corresponding to the image of the original document D read by the original document reading device 4. In a case exemplified in FIG. 9, for the main job and the parallel job, the "aggregation execution" is set as the condition. Accordingly, in the transmission job and the copy job, the original document D is aggregated.

Figure 10:
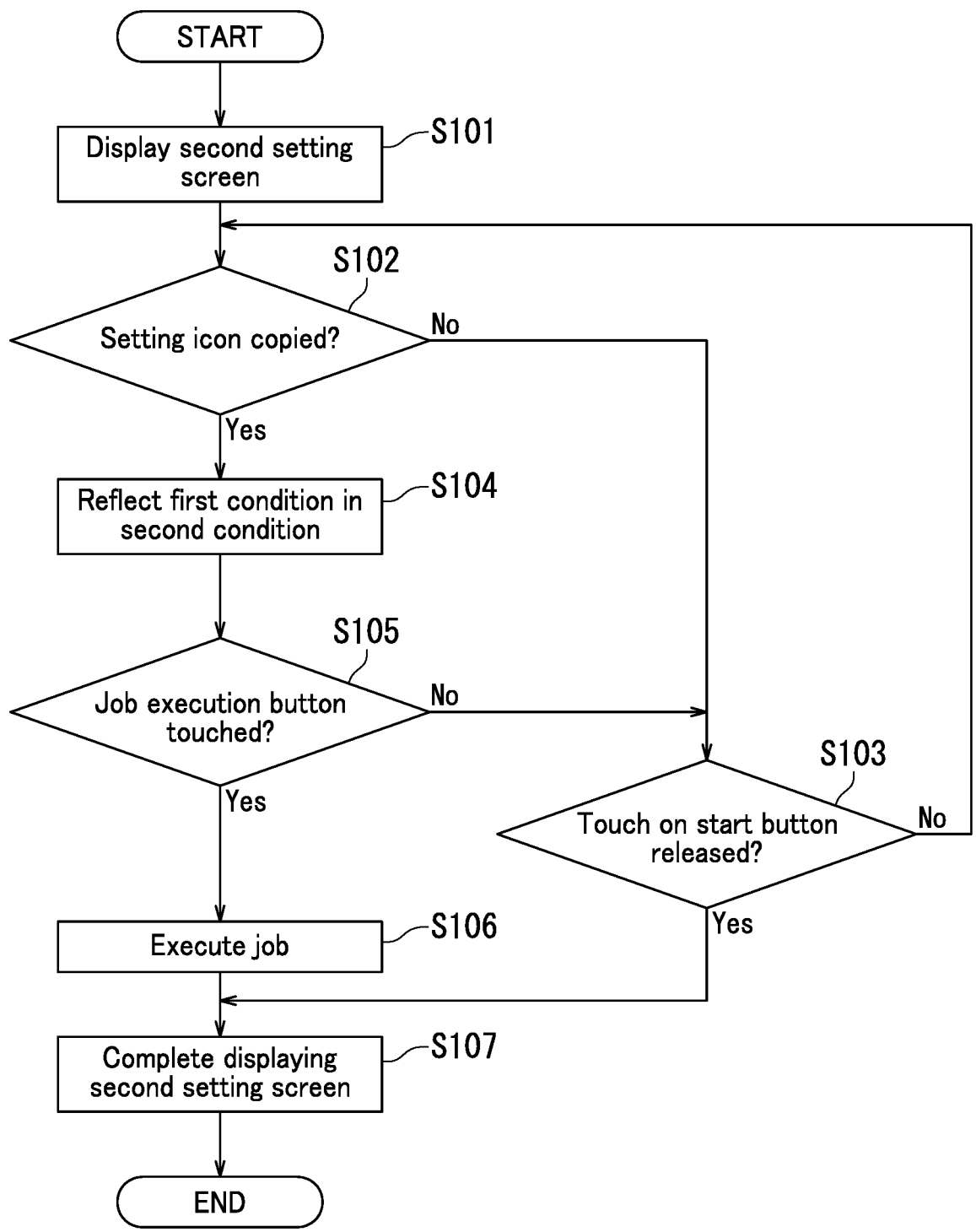
FIG. 10 is a flowchart illustrating second setting screen display processing according to the embodiment of the present disclosure.

Subsequently, referring to FIGS. 1 to 10, second setting screen display processing according to the present embodiment will be described. FIG. 10 is a flowchart illustrating the second setting screen display processing of the present embodiment. The second setting screen display processing is started when the start button B1 described with reference to FIG. 3 is touched and the controller 10 receives a detection signal corresponding to the touch on the start button B1 from the touch display 21.

As illustrated in FIG. 10, when the detection signal corresponding to the touch on the start button B1 is received from the touch display 21, the controller 10 causes the touch display 21 to display the second setting screen SG2 (Step S101). Subsequently, the controller 10 determines whether or not the setting icon T1 has been copied (Step S102). When it is determined that the setting icon T1 has not been copied (Step S102: NO), the controller 10 determines whether or not the touch on the start button B1 has been released (Step S103). When the controller 10 determines that the touch on the start button B1 has not been released (Step S103: NO), the second setting screen display processing returns to Step S102.

When it is determined that the setting icon T1 has been copied (Step S102: YES), the controller 10 reflects the first condition in the second condition (Step S104). Subsequently, the controller 10 determines whether or not the job execution button B2 has been touched (Step S105). When the controller 10 determines that the job execution button B2 has not been touched (Step S105: NO), the second setting screen display processing returns to Step S103. On the other hand, when it is determined that the job execution button B2 has been touched (Step S105: YES), the controller 10 executes the jobs (Step S106). Specifically, the controller 10 executes the main job and the parallel job with the first condition reflected in the second condition.

When the controller 10 executes the jobs (step S106), or when the controller 10 determines that the touch on the start button B1 has been released (Step S103: YES), the controller 10 causes the touch display 21 to complete displaying the second setting screen SG2 (Step S107), and the second setting screen display processing is completed.

The present embodiment has been described so far. According to the present embodiment, a user can cause a condition (first condition) set for a main job to be reflected in a condition (second condition) of a parallel job merely by dragging a setting icon T1 for setting a desired condition. In other words, a user can cause the condition set for the main job to be reflected in the condition of the parallel job without switching a setting screen. Accordingly, setting of a plurality of jobs to be executed in parallel can be easily performed. Thus, a user operation can be eased.

Besides, in the present embodiment, a user can copy the setting icon T1 from at least one main area out of the three main areas merely to the corresponding parallel area. Thus, the first condition (for example, the "aggregation execution") can be inhibited from being duplicately reflected in the second condition.

Besides, in the present embodiment, the controller 10 determines whether or not a user is touching the start button B1. When it is determined that the user is touching the start button B1, the controller 10 causes the touch display 21 to display the second setting screen SG2. On the other hand, when it is determined that the user is not touching the start button B1, the controller 10 does not cause the touch display 21 to display the second setting screen SG2. Accordingly, a user can easily switch the second setting screen SG2 to be displayed or hidden merely by performing the operation (touching or releasing the touch) on the start button B1.

Furthermore, the second setting screen SG2 has transparency in the part excluding the job type area AK and the job setting area AS. Accordingly, even when the touch display 21 is displaying the second setting screen SG2, a user can visually recognize a part of the first setting screen SG1 through the second setting screen SG2. Therefore, a user can easily recognize a screen displayed before displaying the second setting screen SG2 (namely, the first setting screen SG1).

Besides, in the present embodiment, the second setting screen SG2 includes the job execution button B2. Therefore, a user can request the image forming apparatus 100 to execute the main job and the parallel job by touching the job execution button B2 on the second setting screen SG2. In other words, a user can instruct, on one screen, the image forming apparatus 100 to perform the setting of the job conditions and the execution of the main job and the parallel job. Accordingly, a user operation can be eased.

Furthermore, in the present embodiment, the two parallel job setting areas AS2 are opposite to each other in the Y-axis direction across the main job setting area AS1. Therefore, a user can easily drag the setting icon T1. Accordingly, user operability is improved.

Besides, in the present embodiment, the start button B1 is in a semi-circular shape. Therefore, a user can perform various operations on the second setting screen SG2 by radially moving his/her fingers with his/her thumb or another finger used as the origination. Accordingly, the user operability is improved.

Although the start button B1 is described to be displayed to substantially accord with the end side on the Y2 side of the first setting screen SG1 in the present embodiment, the position for displaying the start button B1 is not limited to the position substantially according with the end side on the Y2 side of the first setting screen SG1. The start button B1 may be displayed, for example, to substantially accord with an end side on the Y1 side of the first setting screen SG1.

Besides, although the start button B1 is described to be in a semi-circular shape in the present embodiment, the shape of the start button B1 is not limited to the semi-circular shape. The start button B1 may be in an arc shape.

Furthermore, although the number of the parallel job type areas AK2 is described as two in the present embodiment, the number of the parallel job type areas AK2 is not limited to two. The number of the parallel job type areas AK2 may accord with the number of types of jobs executable by the image forming apparatus 100 in parallel to the main job, and can be one, three or more. It is noted that the parallel job setting areas AS2 can be changed in accordance with the number of the parallel job type areas AK2.

Furthermore, although the main job setting area AS1 is described to include the three main areas (the first main area AS1a to the third main area AS1c) in the present embodiment, the number of main areas included in the main job setting areas AS1 may be one, two, four or more.

In addition, although the first parallel job setting area AS21 and the second parallel job setting area AS22 are described to each include the three parallel areas (the first parallel area AS2a1 to the third parallel area AS21c, or the first parallel area AS22a to the third parallel area AS22c) in the present embodiment, the number of parallel areas included in each of the first parallel job setting area AS21 and the second parallel job setting area AS22 may be one, two, four or more.

Figure 11:
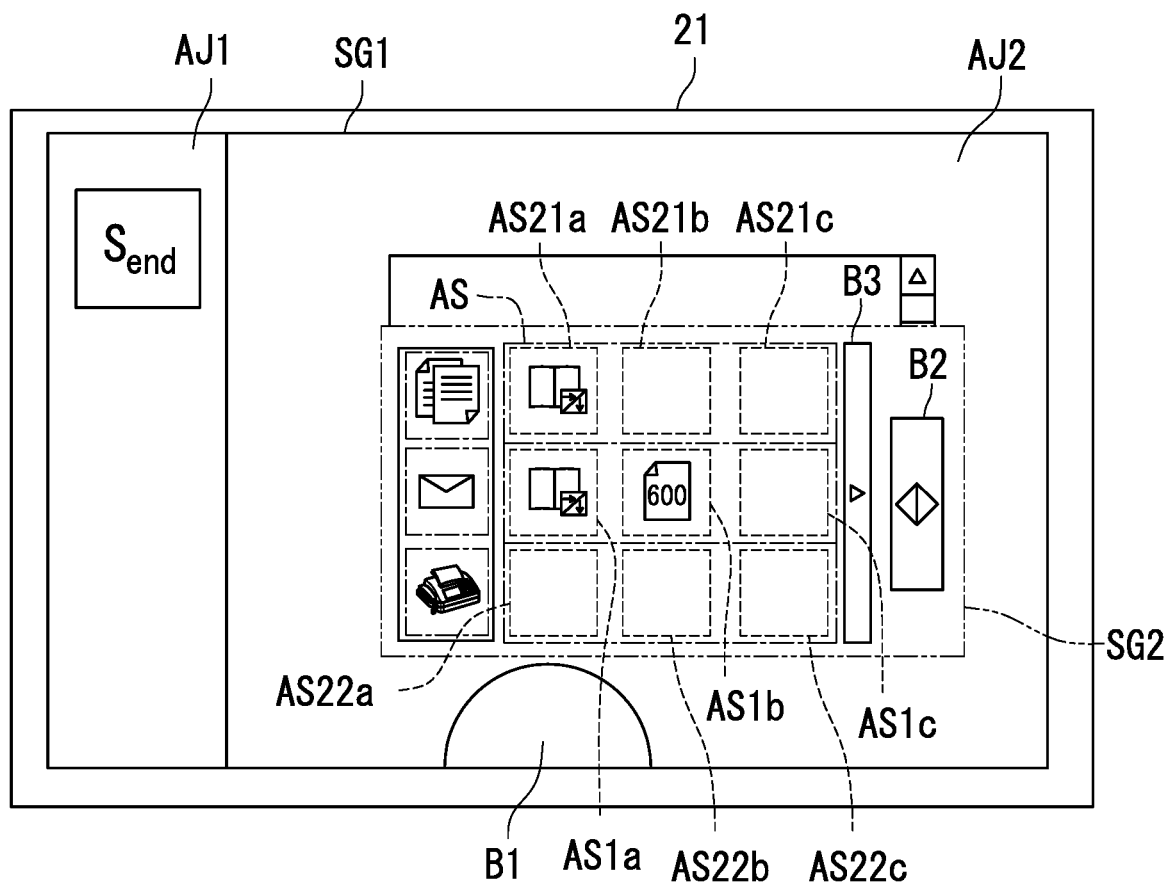
FIG. 11 is a diagram illustrating a variation of the second setting screen according to the embodiment of the present disclosure.

Besides, when the number of the main areas is four or more and the number of the parallel areas is four or more, the second setting screen SG2 may further include an area transition button B3 as illustrated in FIG. 11. FIG. 11 is a diagram illustrating a variation of the second setting screen SG2 of the present embodiment. A user can change a main area and parallel areas to be displayed on the touch display 21 by touching the area transition button B3. It is noted that the first setting screen SG1 visually recognized through the second setting screen SG2 is not illustrated in FIG. 11 for easy understanding.

Furthermore, although the job execution button B2 is described to be included in the second setting screen SG2 in the present embodiment, the job execution button B2 may not be included in the second setting screen SG2. For example, the job execution button B2 may be a hard key 22. In this case, a user can execute the main job and the parallel job in parallel by pressing the job execution button B2 while touching the start button B1.

Figure 12:
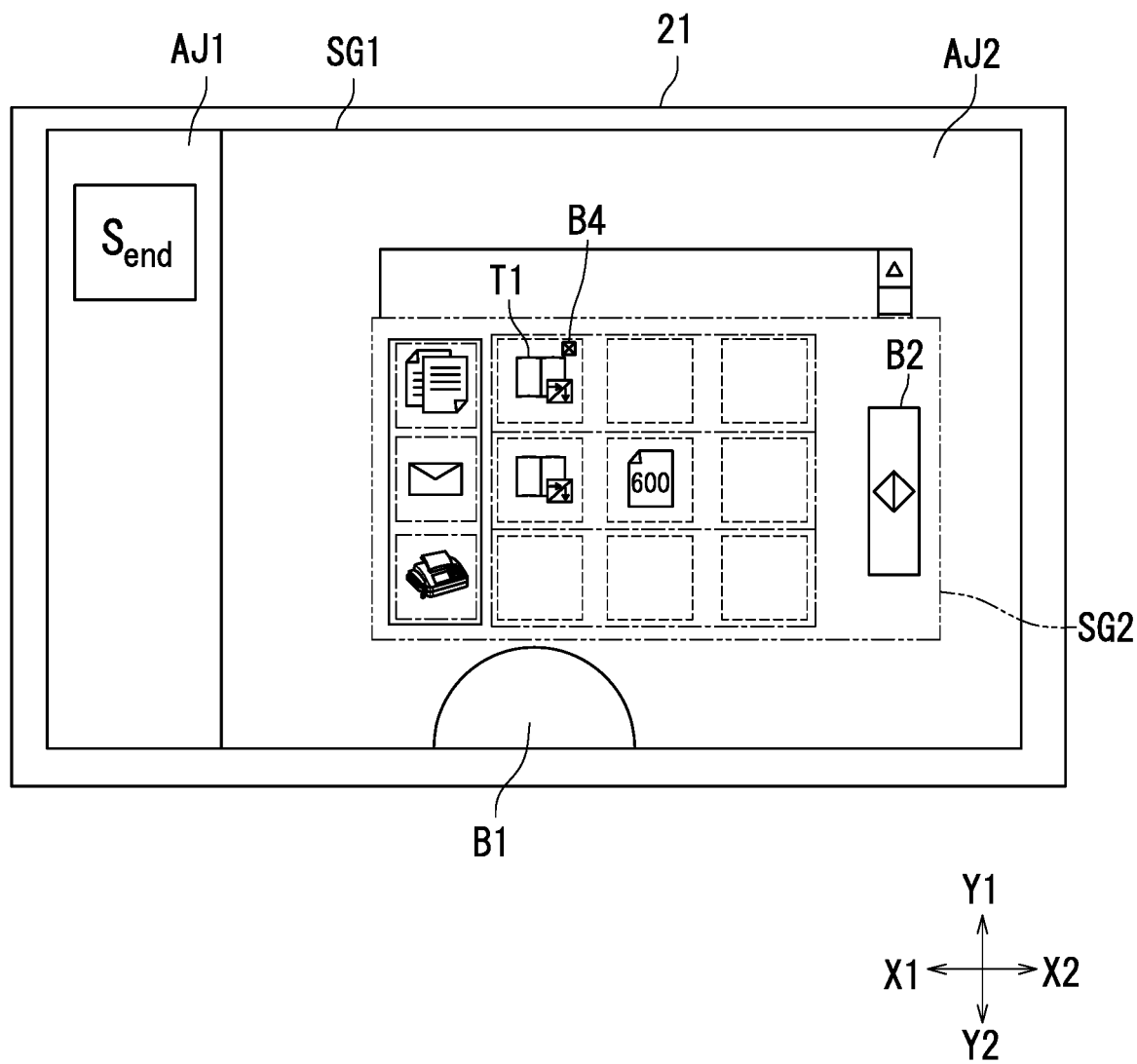
FIG. 12 is a diagram illustrating another variation of the second setting screen according to the embodiment of the present disclosure.

Besides, the second setting screen SG2 may further include a delete button B4 as illustrated in FIG. 12. FIG. 12 is a diagram illustrating another variation of the second setting screen SG2 of the present embodiment. It is noted that the first setting screen SG1 visually recognized through the second setting screen SG2 is not illustrated in FIG. 12 for easy understanding.

As illustrated in FIG. 12, the delete button B4 is displayed in the vicinity of the copied setting icon T1. When there is a plurality of copied setting icons T1, the delete button B4 is displayed in the vicinity of each of the plurality of setting icons T1. A user can delete a setting icon T1 copied in error by touching the delete button B4 displayed in the vicinity of the setting icon T1 copied in error.

The embodiment of the present disclosure has been described so far with reference to the accompanying drawings (FIGS. 1 to 12). It is noted that the present disclosure is not limited to the above-described embodiment but can be practiced in various forms without departing from the spirit thereof. Furthermore, the structure described in the above-described embodiment is illustrative but not restrictive, and can be variously changed and modified without substantially departing from the advantages of the present disclosure.

For example, although the application of the present disclosure to an image forming apparatus employing the electrophotographic method is described in the embodiment of the present disclosure, the present disclosure is applicable to an image forming apparatus employing, for example, an inkjet method different from the electrophotographic method.

What is claimed is:

1. An image forming apparatus comprising:
   a touch display configured to receive a request for executing a first job and display a first setting screen for setting a first condition related to the first job;
   a controller configured to control an operation of the touch display to execute the first job and a second job different from the first job in parallel; and
   a job execution button,
   wherein the first setting screen includes a start button,
   the touch display displays a second setting screen when the start button is touched,
   the second setting screen includes a first job setting area corresponding to the first job, and a second job setting area corresponding to the second job,
   a setting icon corresponding to the first condition set in the first setting screen is displayed in the first job setting area,
   the second job setting area is an area for the setting icon to be copied,
   when the setting icon is copied to the second job setting area, the controller causes the first condition to be reflected in a second condition related to the second job, and when the job execution button is touched, the controller executes, in parallel, the first job and the second job with the first condition reflected in the second condition.

2. The image forming apparatus according to claim 1, wherein the second job setting area includes a plurality of condition areas for the setting icon to be copied.

3. The image forming apparatus according to claim 1, wherein a plurality of the second job setting areas are provided,
the second job setting areas respectively correspond to different types of the second job, and
the second job setting areas are opposite to each other across the first job setting area.

4. The image forming apparatus according claim 1, wherein the job execution button is included in the second setting screen.

5. The image forming apparatus according to claim 1, wherein the controller causes the touch display to display the second setting screen while the start button is being touched.

6. An image forming apparatus comprising:
a touch display configured to receive a request for executing a first job and display a first setting screen for setting a first condition related to the first job;
a controller configured to control an operation of the touch display to execute the first job and a second job different from the first job in parallel; and
storage configured to store first condition data corresponding to the first condition,
wherein the first setting screen includes a start button,
the touch display displays a second setting screen when the start button is touched,
the second setting screen includes a first job setting area corresponding to the first job, and a second job setting area corresponding to the second job,
a setting icon corresponding to the first condition set in the first setting screen is displayed in the first job setting area,
the second job setting area is an area for the setting icon to be copied,
when the setting icon is copied to the second job setting area, the controller causes the first condition to be reflected in a second condition related to the second job,
the storage stores second condition data corresponding to the second condition in which the first condition is reflected, and
the storage stores the first condition data and the second condition data until the first job is executed.

7. The image forming apparatus according to claim 6, wherein the storage stores the first condition data and the second condition data until the first job is executed after a touch on the start button is released.

8. An image forming apparatus comprising:
a touch display configured to receive a request for executing a first job and display a first setting screen for setting a first condition related to the first job; and
a controller configured to control an operation of the touch display to execute the first job and a second job different from the first job in parallel,
wherein the first setting screen includes a start button,
the touch display displays a second setting screen when the start button is touched,
the second setting screen includes a first job setting area corresponding to the first job, and a second job setting area corresponding to the second job,
a setting icon corresponding to the first condition set in the first setting screen is displayed in the first job setting area,
the second job setting area is an area for the setting icon to be copied,
when the setting icon is copied to the second job setting area, the controller causes the first condition to be reflected in a second condition related to the second job,
the second setting screen has transparency, and
the second setting screen is displayed in a layer above the first setting screen.

* * * * *